United States Patent
Yoon et al.

(10) Patent No.: US 9,491,819 B2
(45) Date of Patent: Nov. 8, 2016

(54) HYSTERETIC POWER FACTOR CONTROL METHOD FOR SINGLE STAGE POWER CONVERTERS

(71) Applicant: Dialog Semiconductor Inc., Campbell, CA (US)

(72) Inventors: Juyoung Yoon, San Ramon, CA (US); Xiaolin Gao, Santa Clara, CA (US); Fuqiang Shi, Oak Park, IL (US)

(73) Assignee: Dialog Semiconductor Inc., Campbell, CA (US)

( * ) Notice: Subject to any disclaimer, the term of this patent is extended or adjusted under 35 U.S.C. 154(b) by 276 days.

(21) Appl. No.: 14/332,068

(22) Filed: Jul. 15, 2014

(65) Prior Publication Data

US 2016/0020691 A1 Jan. 21, 2016

(51) Int. Cl.
H02M 1/42 (2007.01)
H05B 33/08 (2006.01)
H02M 3/335 (2006.01)

(52) U.S. Cl.
CPC ....... H05B 33/0815 (2013.01); H02M 1/4258 (2013.01); *H02M 3/33507* (2013.01); *Y02B 70/126* (2013.01)

(58) Field of Classification Search
USPC ........................................ 323/265, 282, 284
See application file for complete search history.

(56) References Cited

U.S. PATENT DOCUMENTS

| | | | | |
|---|---|---|---|---|
| 5,134,355 A | * | 7/1992 | Hastings | H02M 1/4208 323/211 |
| 5,734,562 A | * | 3/1998 | Redl | H02M 1/4208 323/222 |
| 5,991,172 A | * | 11/1999 | Jovanovic | H02M 1/4258 363/132 |
| 6,944,034 B1 | * | 9/2005 | Shteynberg | H02M 1/4258 323/282 |
| 7,378,805 B2 | * | 5/2008 | Oh | H05B 33/0815 315/219 |
| 7,443,700 B2 | | 10/2008 | Yan et al. | |
| 8,787,039 B2 | | 7/2014 | Shi et al. | |

(Continued)

FOREIGN PATENT DOCUMENTS

EP WO2009156891 * 12/2009 ............. H02M 1/42

OTHER PUBLICATIONS

PCT International Search Report and Written Opinion, PCT Application No. PCT/US2015/037243, Sep. 23, 2015, 18 pages.

*Primary Examiner* — Jessica Han
*Assistant Examiner* — David A. Singh
(74) *Attorney, Agent, or Firm* — Fenwick & West LLP

(57) ABSTRACT

In one aspect, a switching power converter is described that includes a transformer, a switch, and a controller that generates a control signal to turn on and turn off the switch. For each alternating current (AC) half-cycle of an input voltage, the controller determines a minimum value of a signal representing an on-time of the power converter, compares the determined minimum value with a threshold value that is used to determine whether the switching power converter operates in a constant on-time mode or in a constant power mode, and adjusts the threshold value based on a result of the comparison. The controller further generates the control signal to operate the switching power converter in a constant power mode during a first time period of the AC half-cycle, the first time period representing a duration where the threshold value is larger than an instantaneous value of the first signal.

20 Claims, 9 Drawing Sheets

(56) References Cited

U.S. PATENT DOCUMENTS

| | | | | |
|---|---|---|---|---|
| 2004/0136208 A1* | 7/2004 | Agarwal | H02M 1/4208 | 363/21.12 |
| 2005/0099828 A1* | 5/2005 | Cheng | H02M 1/4258 | 363/21.16 |
| 2008/0031021 A1* | 2/2008 | Ros | H02M 1/4258 | 363/46 |
| 2008/0117653 A1* | 5/2008 | Saito | H01L 29/405 | 363/20 |
| 2009/0201705 A1* | 8/2009 | Murata | H02M 1/32 | 363/53 |
| 2010/0002480 A1 | 1/2010 | Huynh et al. | | |
| 2011/0285301 A1 | 11/2011 | Kuang et al. | | |
| 2012/0075891 A1* | 3/2012 | Zhang | H02M 3/335 | 363/21.18 |
| 2012/0153858 A1 | 6/2012 | Melanson et al. | | |
| 2013/0100708 A1* | 4/2013 | Yen | H02M 1/4258 | 363/21.01 |
| 2013/0121032 A1 | 5/2013 | Shi et al. | | |
| 2013/0134894 A1 | 5/2013 | Kuang | | |
| 2014/0022829 A1* | 1/2014 | Shi | H02M 1/4258 | 363/84 |
| 2014/0036552 A1* | 2/2014 | Saji | H02M 1/44 | 363/21.17 |
| 2014/0085941 A1 | 3/2014 | Li et al. | | |
| 2014/0184145 A1* | 7/2014 | Degen | H03K 5/14 | 320/107 |
| 2014/0211519 A1* | 7/2014 | Hsu | H02M 1/4258 | 363/21.17 |
| 2014/0268918 A1* | 9/2014 | Gong | H02M 7/217 | 363/21.15 |
| 2014/0268938 A1* | 9/2014 | Matthews | H02M 1/32 | 363/50 |
| 2015/0311803 A1* | 10/2015 | Schaemann | H02M 1/4258 | 315/210 |

* cited by examiner

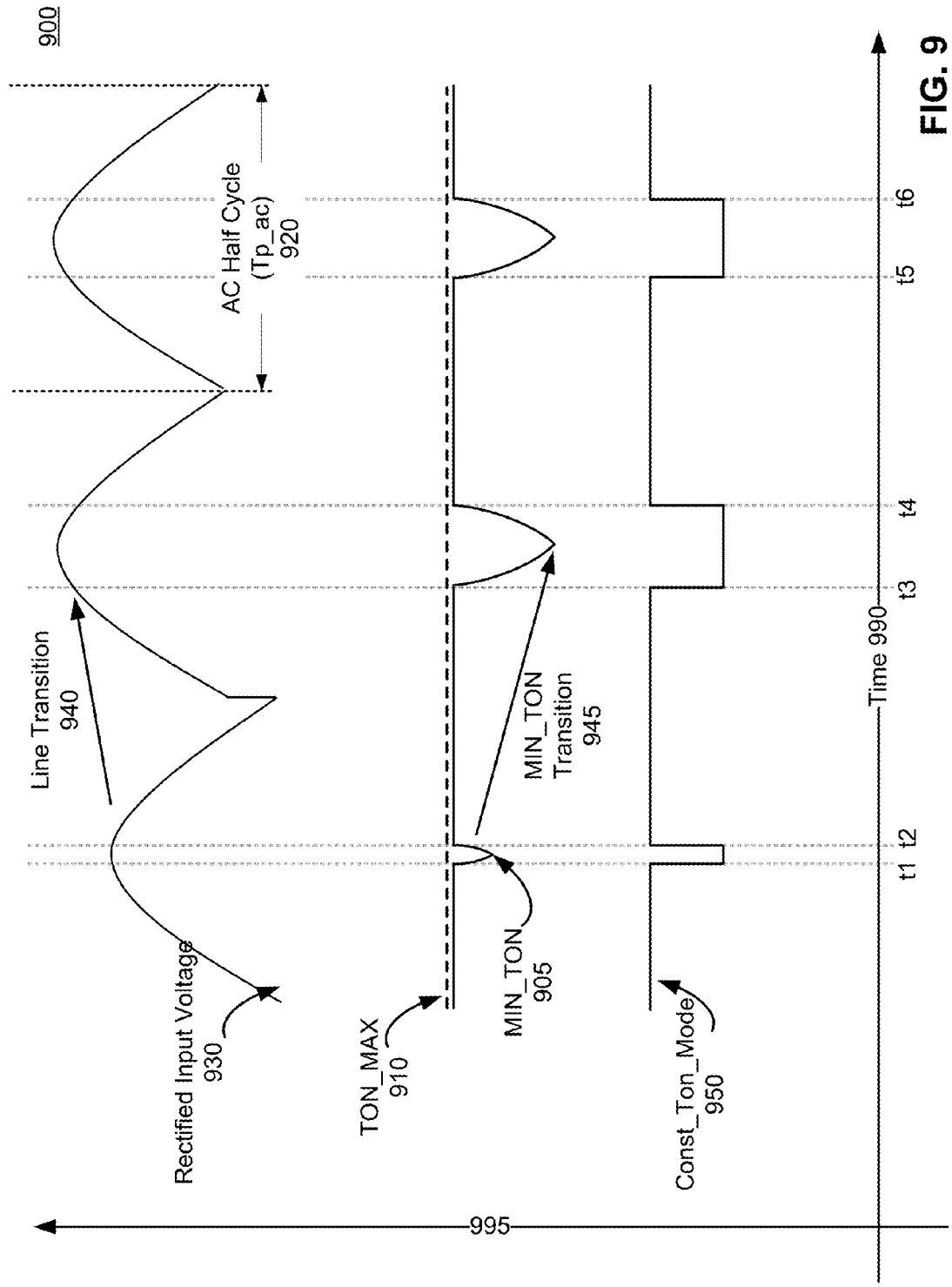

HYSTERETIC POWER FACTOR CONTROL METHOD FOR SINGLE STAGE POWER CONVERTERS

BACKGROUND

Field of the Disclosure

This disclosure pertains to switching power converters with power factor correction.

Description of the Related Art

Power factor in switching power converters is defined as the ratio of the real power delivered to the load to the apparent power provided by the power source. Utility companies or government agencies require power factors in switching power converters to exceed a certain minimum level by regulation. Thus, switching power converters should deliver power from the power source to the load with a high power factor and low total harmonic distortion (THD).

Current single-phase active power factor control techniques are generally divided into two categories: a two-stage approach and a single-stage approach. In the two-stage approach, a power factor control front-end stage converts alternating current (AC) input voltage into a direct current (DC) voltage on a bulk energy storage capacitor. A DC/DC converter such as a flyback switching power converter is used as the second output stage to provide isolated and regulated low output voltage or high output current to a load. In contrast, the single-stage approach combines the power factor control stage with the DC/DC stage into a single stage. In the single-stage approach, a single switch is controlled to achieve the dual function of input power factor correction and output voltage/current regulation.

Generally, two-stage power factor control circuits utilize a separate stage to shape the input current to be near sinusoidal and in phase with the input line voltage to achieve high input power factor and low THD. However, the efficiency of the two-stage power factor control circuits is generally lower than the single-stage power factor control circuits because energy is processed twice in the two stages of the two-stage power factor control circuits. Furthermore, because of the use of two stages, two-stage power factor control circuits are more complex and costly compared to single-stage power factor control circuits. Thus, single-stage power factor control circuits are usually preferred for low-power applications due to cost and efficiency considerations.

SUMMARY

Embodiments of the present disclosure herein describe switching power converters with power factor correction. The switching power converter can be, for example, a switching flyback power converter. The switching power converter is configured to provide power to an output load, such as an LED load. The switching power converter can provide power to the output load via, for example, a transformer's primary and secondary windings for flyback power converter, or single inductor for buck-boost or buck power converters.

An exemplary flyback power converter includes a transformer, a switch, and a controller to generate a control signal to turn on and turn off the switch at each of a plurality of switching cycles of the switch. For each alternating current (AC) half-cycle of the input voltage, the controller determines a minimum value of a signal representing an on-time of the power converter, compares the determined minimum value with a threshold value of the signal that is used to determine whether the switching power converter operates in a constant on-time mode or in a constant power mode, and adjusts the threshold value by increasing or decreasing the threshold value based on a result of the comparison. The controller generates the control signal to operate the switching power converter in a constant power mode during a first time period of the AC half-cycle, the first time period representing a duration where the threshold value is larger than an instantaneous value of the first signal.

In one embodiment, the controller generates the control signal to operate the switching power converter in a constant on-time mode during a second time period of the AC half-cycle, the second time period representing a duration that is different from the first time period and a sum of the first time period and the second time period results in a time period of the AC half-cycle.

In one embodiment, the controller adjusts the threshold value by increasing the threshold value when the comparison results in the minimum value being larger than the threshold value.

In one embodiment, the controller, in response to an increase in the input voltage during a line-transient event (i.e. input AC line voltage steps up), decreases the threshold value in proportion to the input voltage increase.

In one embodiment, the controller adjusts the threshold value by decreasing the threshold value when the comparison results in the minimum value being smaller than the threshold value.

In one embodiment, the controller, in response to a decrease in the input voltage during a line-transient event (i.e. input AC line voltage steps down), increases the threshold value by a predetermined value.

In one embodiment, the controller determines the minimum value, compares the minimum value with the threshold value, and adjusts the threshold value in a digital implementation of a control loop.

In one embodiment, the controller adjusts the threshold value by adding a dithering value to convert a fractional value of the threshold value adjustment into an integer value spread over each alternating current half-cycle of the input voltage.

In one embodiment, the controller adjusts the threshold value by converting a fractional value of the threshold value adjustment into an integer value by using a truncating function.

In one embodiment, the switching power converter such as buck or buck-boost converters, include an inductor, a switch, and a controller to generate a control signal to turn on and turn off the switch at each of a plurality of switching cycles of the switch such that the controller generates the control signal to operate the switching power converter in a constant power mode during a first time period of the AC half-cycle, the first time period representing a duration where the threshold voltage is larger than an instantaneous value of a first signal, the first signal representing an on-time of the switching power converter.

Embodiments also relate to a method of controlling a switching power converter, the switching power converter includes a transformer coupled between an input voltage and an output of the switching power converter, the transformer including a primary winding coupled to the input voltage and a secondary winding coupled to the output of the switching power converter, and a switch coupled to the primary winding of the transformer, current passing through the primary winding while the switch is turned on and not passing through while the switch is turned off. The method includes generating a control signal to turn on and turn off the switch at each of a plurality of switching cycles of the switch. The method also includes, for each alternating current (AC) half-cycle of the input voltage, determining a minimum value of a signal representing an on-time of the power converter, comparing the determined minimum value with a threshold value of the signal that is used to determine whether the switching power converter operates in a constant on-time mode or in a constant power mode, and adjusting the threshold value by increasing or decreasing the threshold value based on a result of the comparison. The method further includes generating the control signal to operate the switching power converter in a constant power mode during a first time period of the AC half-cycle, the first time period representing a duration where the threshold value is larger than an instantaneous value of the first signal.

BRIEF DESCRIPTION OF THE DRAWINGS

The teachings of the embodiments disclosed herein can be readily understood by considering the following detailed description in conjunction with the accompanying drawings.

FIG. 9 illustrates exemplary waveforms of the controller IC in response to a transition of the input voltage from a low voltage to a high voltage, according to one embodiment.

DETAILED DESCRIPTION

Figure 1:
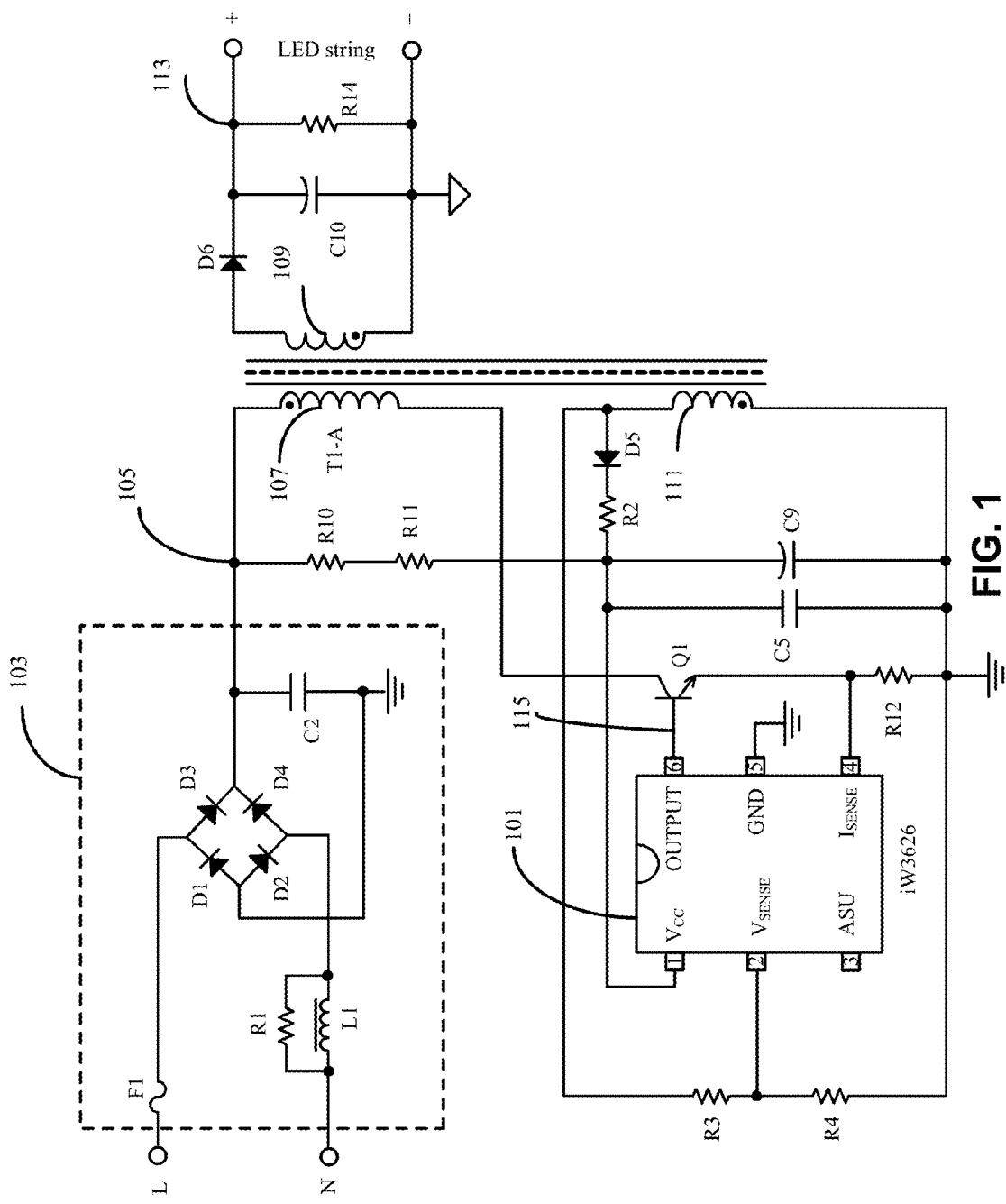
FIG. 1 illustrates a switching power converter that uses a combination of constant on-time control and constant power control, according to one embodiment.

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

This disclosure describes a power factor control method that can achieve a very high power factor (e.g., greater than 0.9 and approaching 1.0) for switching power converters. The method includes a hysteretic loop that can generate a signal representing a switch on-time for the power converter such that a product of a magnitude of the switch on-time and an amplitude of rectified input voltage is constant in a constant power mode. The hysteretic loop includes generating a threshold value for the switch on-time signal that determines whether the power converter operates in a constant on-time mode or a constant power mode. For example, when a minimum value of the switch on-time signal for a given input AC cycle is smaller than the threshold value, the power converter is operated in a constant power mode. And when the minimum value is larger than the threshold value, the power converter is operated in a constant on-time mode.

For applications that require a high power factor (e.g., 0.95), the power converter needs to be operated in the constant on-time mode for 95% of the AC cycle with a low enough THD (e.g., less than 20%). To achieve a high power factor and low THD, the hysteretic loop can adjust the threshold value of the loop such that the threshold value is very close to the minimum value of the switch on-time signal. By adjusting the threshold value of the loop to track the minimum value, the hysteretic loop can achieve a power factor that is very close to 1.0. Ideally, if threshold value can be adjusted to be the same as the minimum value of the on-time signal, then a power factor of 1.0 can be achieved. But as there are always non-ideal conditions such as noise, the achievable power factor approaches a value close to 1.0. In a digital implementation of the hysteretic loop, the loop adjusts the threshold value such that at steady state the threshold value toggles between two adjacent step values surrounding the minimum value of the switch on-time, as described in detail with reference to FIGS. 6 and 7. Because the threshold value toggles between two values at steady state, the loop has a hysteresis feature.

Embodiments of the present disclosure relate to switching power converters with power factor correction. The switching power converter includes a transformer, a switch and a controller configured to generate a control signal to turn on and turn off the switch. For each alternating current (AC) half-cycle of an input voltage, the controller determines a minimum value of a signal representing an on-time of the power converter, compares the determined minimum value with a threshold value of the signal that is used to determine whether the switching power converter operates in a constant on-time mode or in a constant power mode, and adjusts the threshold value by increasing or decreasing the threshold value based on a result of the comparison. The controller generates the control signal to operate the switching power converter in a constant power mode during a first time period of the AC half-cycle, the first time period representing a duration where the threshold value is larger than an instantaneous value of the first signal.

FIG. 1 illustrates an AC to DC flyback switching power converter, according to one embodiment. Power converter 100 includes three principal sections, i.e., a front end, a power stage, and a secondary stage. Front end 103 is connected to an AC voltage source (not shown) at nodes L, N, and includes a bridge rectifier comprised of inductor L1, resistor R1, fuse F1, diode D1, diode D2, diode D3, diode D4, and bulk capacitor C2. The rectified input line voltage at node 105 is input to the supply voltage pin Vcc (pin 1) of controller IC 101 via resistors R10 and R11. The line voltage at node 105 is also coupled to primary winding 107 of power transformer T1-A. Capacitor C5 removes high frequency noise from the rectified line voltage input to the supply voltage pin Vcc (pin 1). The output of the front end section at node 105 is an unregulated DC input voltage.

The power stage is comprised of power transformer T1-A, bipolar junction transistor (BJT) power switch Q1, and controller IC 101. Power transformer T1-A includes a primary winding 107, a secondary winding 109, and an auxiliary winding 111. Controller IC 101 maintains output regulation via control of the ON and OFF states of BJT power switch Q1 via a control signal 115 output from the OUTPUT pin (pin 6) of controller IC 101. Control signal 115 drives the base (B) of BJT power switch Q1. The collector (C) of BJT power switch Q1 is connected to the primary winding 107, while the emitter (E) of BJT power switch Q1 is connected to the $I_{SENSE}$ pin (pin 4) of controller IC 101 and to ground via resistor R12. The $I_{SENSE}$ pin (pin 4) senses the current through the primary winding 107 and BJT switch Q1 in the form of a voltage across sense resistor R12. Controller IC 101 can employ any one of a number of modulation techniques, such as pulse-width-modulation (PWM) or pulse-frequency-modulation (PFM) and/or their combinations, to control the ON and OFF states and duty cycle of BJT switch Q1, as well as the amplitude of the base current of the BJT switch Q1. In one embodiment, controller IC 101 determines and practices the configurable power factor control method for the switching power converter 100 as will be further described below. The GND pin (pin 5) of controller IC 101 is connected to ground. In one embodiment, transformer T1-A can be replaced with an inductor.

The secondary stage is comprised of diode D6 functioning as an output rectifier and capacitor C10 functioning as an output filter. The resulting regulated output voltage Vout at node 113 is delivered to the load (not shown). Resistor R14 is the pre-load that is typically used for stabilizing the output in case of no load conditions of flyback switching power converter 100.

The output voltage Vout at node 113 is reflected across auxiliary winding 111, which is input to the $V_{SENSE}$ pin (pin 2) of controller 101 via a resistive voltage divider comprised of resistors R3 and R4. Capacitor C9 is used to hold power from the line voltage at node 105 at start-up or from the voltage across auxiliary winding 111 after start-up between switching cycles.

As mentioned previously, a single switch Q1 is used in single-stage power factor control circuits to regulate output power. However, switch Q1 also affects both the input current and output current. If bulk capacitor C2 in a single-stage power factor control circuit is small, input voltage distortion is minimized thus resulting in high power factor using a constant on-time control method of switch Q1 with either fixed or variable switching frequency operation. During the constant on-time control method, switch Q1 is turned on for the same length of time during each switching cycle of operation of power converter 100.

Figure 2:
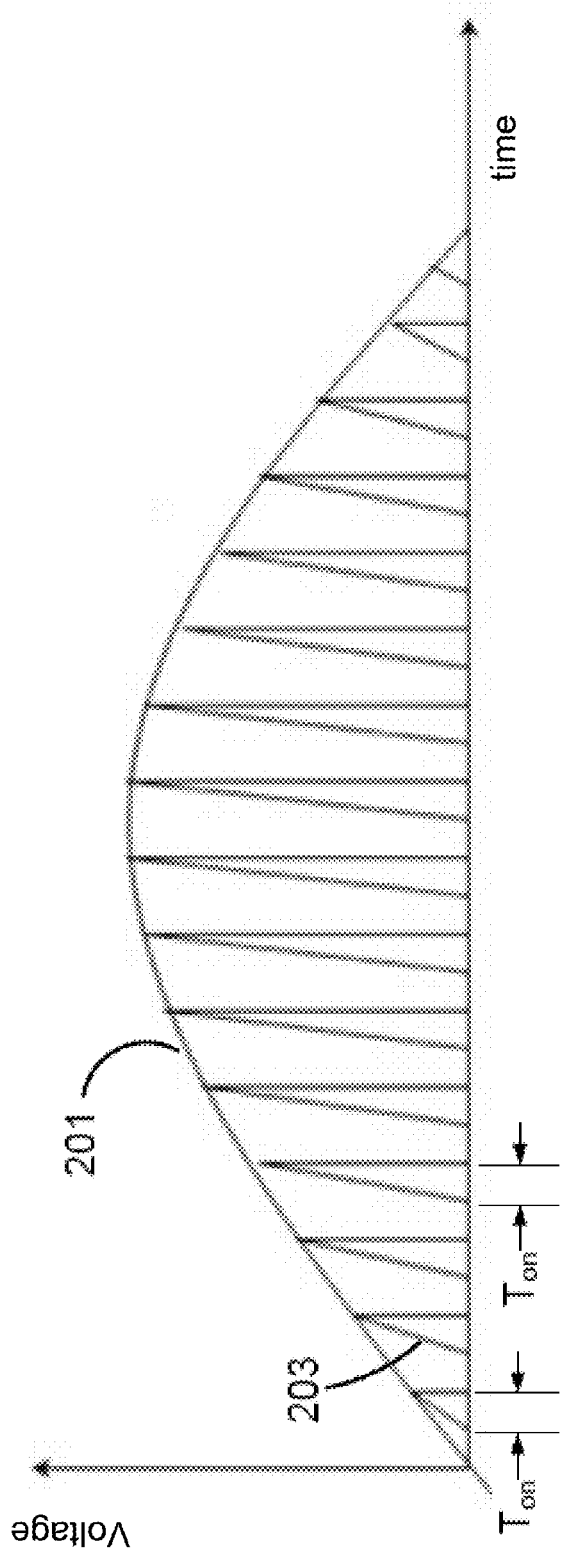
FIG. 2 illustrates input voltage and input current waveforms of a conventional switching power converter, according to one embodiment.

FIG. 2 illustrates a voltage waveform 201 of the voltage at the bulk capacitor C2 with respect to an input current waveform 203 of the input current in a conventional single-stage power factor control circuit using constant on-time control. As shown in FIG. 2, with the constant on-time control method, average input current 203 follows voltage 201 on bulk capacitor C2. Thus, the input current to power converter 100 follows the input voltage to power converter 100 if there is little voltage distortion on bulk capacitor C2. High power factor is therefore ensured using the single-stage approach with constant on-time control of the switch Q1. However, using the constant on-time control method results in a large output ripple at the output of power converter 100 which requires a large output capacitor to filter the output ripple.

To obtain good output ripple performance, constant power delivery during an alternating current (AC) cycle in either a constant voltage mode or a constant current mode is used. The following equation is representative of the power (P) of switching power converter 100 where $V_{in}$ is the input voltage at the bulk capacitor C2, $L_m$ is the primary winding inductance, $T_{on}$ is the on-time of switch Q1, and $F_s$ is the switching frequency of switching power converter 100, assuming transformer is ideal (efficiency is 1) to transfer energy from primary side to secondary side:

$$P = \frac{(V_{in} \cdot T_{on})^2}{2 \cdot L_m} \cdot F_s$$

According to the above equation, in order to maintain constant power delivery to the load, the product of the input voltage to switching power converter 100 and on-time of switch Q1 must be constant. Therefore, when the input voltage increases, the on-time of the switch Q1 must decrease to maintain constant power delivery to the load. However, if constant power control is used, the input current to switching power converter 100 will have high distortion (i.e., the input current diverts from being sinusoidal) due to the power balance requirement (i.e., constant power delivered to the load) of the single-stage power factor control approach thereby resulting in the inability to achieve a high power factor.

For many low-power applications, power factor requirements are not necessarily very high. For example, a power factor of 0.7 or less is sufficient for a 10-watt consumer light emitting diode (LED) lighting. However, using a constant on-time control method could result in a power factor of 0.95, for example, which may be excessive for low-power applications. Thus, for low-power applications, a constant turn-on control method over the entire AC cycle is not necessary to meet the power factor requirements as well as to meet harmonic regulation requirements such as EN61000-3-2. Accordingly, controller IC 101 combines the power regulation control methods of constant on-time control and constant power control (i.e., constant voltage mode and/or constant current mode) to adjust the power factor of switching power converter 100 to balance the tradeoffs of the constant on-time mode and the constant power mode to meet power factor requirements for low power applications and for output ripple performance. Alternatively, there are some high power applications where a power factor of close to 1.0 (i.e., approaching a value of 1.0 as in power factor of 0.95) is necessary and it is essential that switching power converter 100 has the ability to deliver power at a power factor of close to 1.0. For example, applications involving a power of more than 20 W might require a power factor close to 1.0 and a total harmonic distortion (THD) less than 20%.

Figure 3:
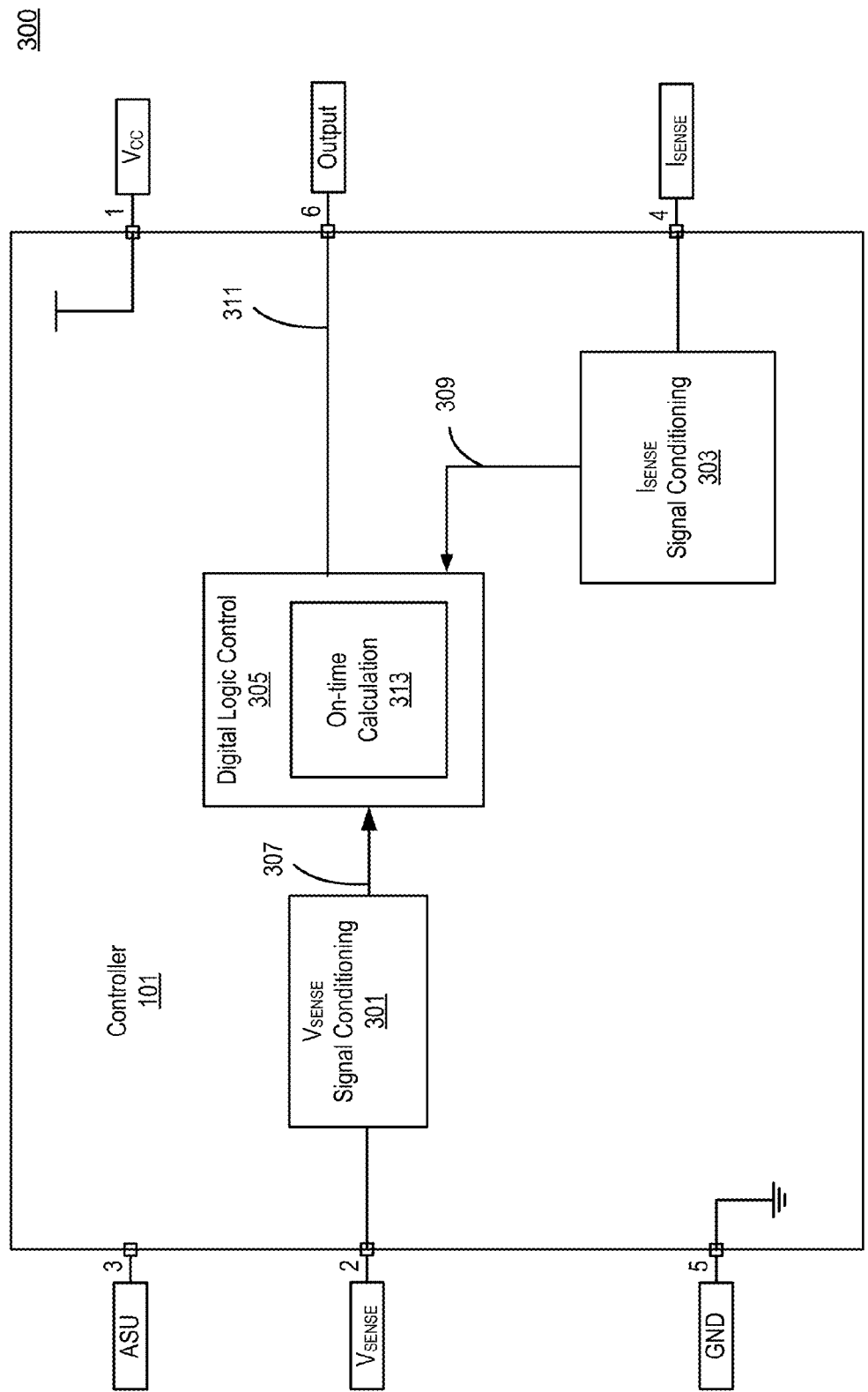
FIG. 3 illustrates the internal circuitry of the controller integrated circuit of the switching power converter, according to one embodiment.

FIG. 3 illustrates the internal circuitry of controller 101 according to one embodiment. Controller 101 receives analog parameters such as the $V_{SENSE}$ voltage at pin 2 and the $I_{SENSE}$ voltage at pin 4, but can adaptively processes these parameters using digital circuitry and digital state machines (not shown) to generate the appropriate base drive signal at pin 6 (Output). Controller 101 includes several main circuit blocks, including $V_{SENSE}$ signal conditioning block 301, $I_{SENSE}$ signal conditioning block 303, and digital logic control block 305. Controller IC 101 regulates the output voltage Vout and output current Iout of switching power converter 100 by means of adaptive digital, primary-side feedback control.

$V_{SENSE}$ signal conditioning block 301 receives $V_{SENSE}$ voltage as an analog voltage signal and generates one or more voltage feedback signals 307 that reflect the output voltage (Vo) at node 113. $I_{SENSE}$ signal conditioning block 303 receives the $I_{SENSE}$ voltage as an analog voltage signal and generates one or more current feedback signals 309 that reflect the primary side current flowing through switch Q1. Sensing the $V_{SENSE}$ voltage allows for precise output voltage regulation, and sensing the $I_{SENSE}$ voltage allows for precise cycle-by-cycle peak current control and limiting in both constant voltage and constant current modes as well as precise constant current (output current Iout) control that is insensitive to the magnetizing inductance Lm of the transformer T1-A.

Digital logic control block 305 processes voltage feedback signals 307 and current feedback signals 309 to generate control signal 311 that governs the operation and on/off states of the switch Q1 for regulation of output voltage (Vo) and output current (Iout). Although not shown, digital logic control block 305 includes digital circuitry that determines the proper operation mode under which switching power converter 100 should operate. This digital circuitry adaptively selects either pulse width modulation (PWM) or pulse frequency modulation (PFM) for control of switching frequency, and either constant power mode (i.e., constant voltage (CV) mode or constant current (CC) mode) or constant on-time mode for output regulation. For example, during the constant power mode that utilizes the CC mode, the load at the output of power converter 100 may be a string of light emitting diodes (LEDs) where the voltage drop across the LEDs is a function of the constant current that is applied across the LEDs. Thus, the voltage drop across the LEDs is constant since constant current is supplied to the LEDs resulting in constant power being delivered to the load.

In one embodiment, during each AC cycle (or each half-cycle) of the input voltage to the power converter 100 (i.e., a single AC cycle) digital logic control block 305 determines whether to operate power converter 100 in the constant power mode or the constant on-time mode based on the magnitude of the instantaneous input line voltage as frequently as at the switching frequency of the switching power converter 100. In other embodiments, digital logic control block 305 may determine whether to operate power converter 100 in the constant power mode or the constant on-time mode based on the magnitude of the instantaneous input line voltage at only certain switching cycles of switching power converter 100. Note that the frequency of the input voltage is different than the switching frequency of power converter 100. The frequency of the input voltage is 50 Hz or 60 Hz compared to the higher switching frequency of switch Q1 of power converter 100 which is in the kHz range (e.g., 40 kHz-200 kHz). That is, there are going to be a plurality of switching cycles for each cycle (and half-cycle) of input voltage.

Particularly, digital logic control block 305 operates power converter 100 in the constant on-time mode during the AC cycle of the input voltage if the instantaneous input line voltage is lower than a threshold voltage and switches the mode of operation to the constant power mode if the instantaneous line voltage is above the threshold voltage as frequently as at the switching frequency of switching power converter 100. Alternatively, digital logic control block 305 switches the mode of operation to the constant power mode from the constant on-time mode if the instantaneous line voltage is above the threshold voltage at only certain switching cycles of switching power converter 100. Thus, digital logic control block 305 monitors the instantaneous input line voltage to determine whether the instantaneous input line voltage is lower or higher than the threshold voltage and operates power converter 100 in either the constant on-time mode or constant power mode at the next switching cycle within the AC cycle of the input voltage to power converter 100 based on the magnitude of the instantaneous input line voltage.

Assuming that the input line voltage is sinusoidal, within a single AC cycle of the input voltage to power converter 100, digital logic control block 305 operates switching power converter 100 in the constant on-time mode while the instantaneous line voltage is below the threshold voltage. Once the instantaneous input line voltage of the AC cycle exceeds the threshold voltage, digital logic control block 305 switches the operation of switching power converter 100 to the constant power mode. More specifically, at the next switching cycle of power converter 100 after the instantaneous input line voltage of the AC cycle exceeds the threshold voltage, digital logic control block 305 switches the operation of power converter 100 from the constant-on-time mode to the constant power mode.

Because the input line voltage is sinusoidal, the input line voltage eventually decreases below the threshold voltage during the AC cycle of the input voltage to power converter 100 and digital logic control block 305 switches the operation of switching power converter 100 back to the constant on-time mode. That is, at the next switching cycle of power converter 100 after the instantaneous input line voltage of the AC cycle decreases below the threshold voltage, digital logic control block 305 switches the operation of power converter 100 from the constant power mode to the constant-on time mode.

In one embodiment, the threshold voltage is based on the percentage of time that power converter 100 is configured to operate in the constant on-time mode within an AC cycle of the input voltage. For example, assuming a 110 volt line voltage in North America, if power converter 100 is configured to operate in the constant on-time mode for 50 percent of an AC cycle of the input voltage, the threshold voltage is 110 volts (i.e., Sqrt(2)*110*sin(45°)).

During the constant on-time mode, digital logic control block 305 outputs control signal 311 to turn on switch Q1 with a constant on-time during which switch Q1 is turned on. That is, during the constant on-time mode, the on-time of switch Q1 is constant (i.e., remains the same) across the switching cycles of power converter 100. During the constant power mode, digital logic control block 305 outputs control signal 311 to turn on switch Q1 with an on-time that may vary switching cycle by switching cycle and is less than the constant on-time of switch Q1 during the constant on-time mode, according to one embodiment. During the constant power mode, power converter 100 may output constant current and/or voltage depending on the control method employed to deliver constant power to the load. Thus, digital logic control block 305 switches operation between the constant on-time mode and the constant power mode any number of times during the switching cycles of power converter 100 within a single AC cycle based on the magnitude of the instantaneous input voltage with respect to the threshold voltage. By switching the operation of the power converter between the constant on-time mode and the constant power mode during the AC cycle of input voltage to power converter 100, power factor requirements can be met while still providing good output ripple performance.

In one embodiment, digital logic control block 305 determines the input line voltage using the voltage at the $I_{SENSE}$ pin of controller 101. The voltage at the $I_{SENSE}$ pin functions as a proxy for the input line voltage Vin because the slope of increase of the primary current $I_p$ through switch Q1

(represented by the $I_{SENSE}$ voltage) is substantially proportional to the input line voltage, through the relationship Vin=Lm (d$I_p$/dt), where Lm is the magnetizing inductance of the primary winding 107 of transformer T1-A. Particularly, controller 101 uses the $I_{SENSE}$ voltage as a proxy for the line voltage Vin in CV mode and can also use the $I_{SENSE}$ voltage (representing the primary current $I_p$) in CC mode to maintain a constant, regulated output current from switching power converter 100 as described in U.S. Pat. No. 7,443,700 issued to Yan et al. on Oct. 28, 2008, and assigned to iWatt Inc., which is incorporated by reference herein in its entirety.

Figure 4:
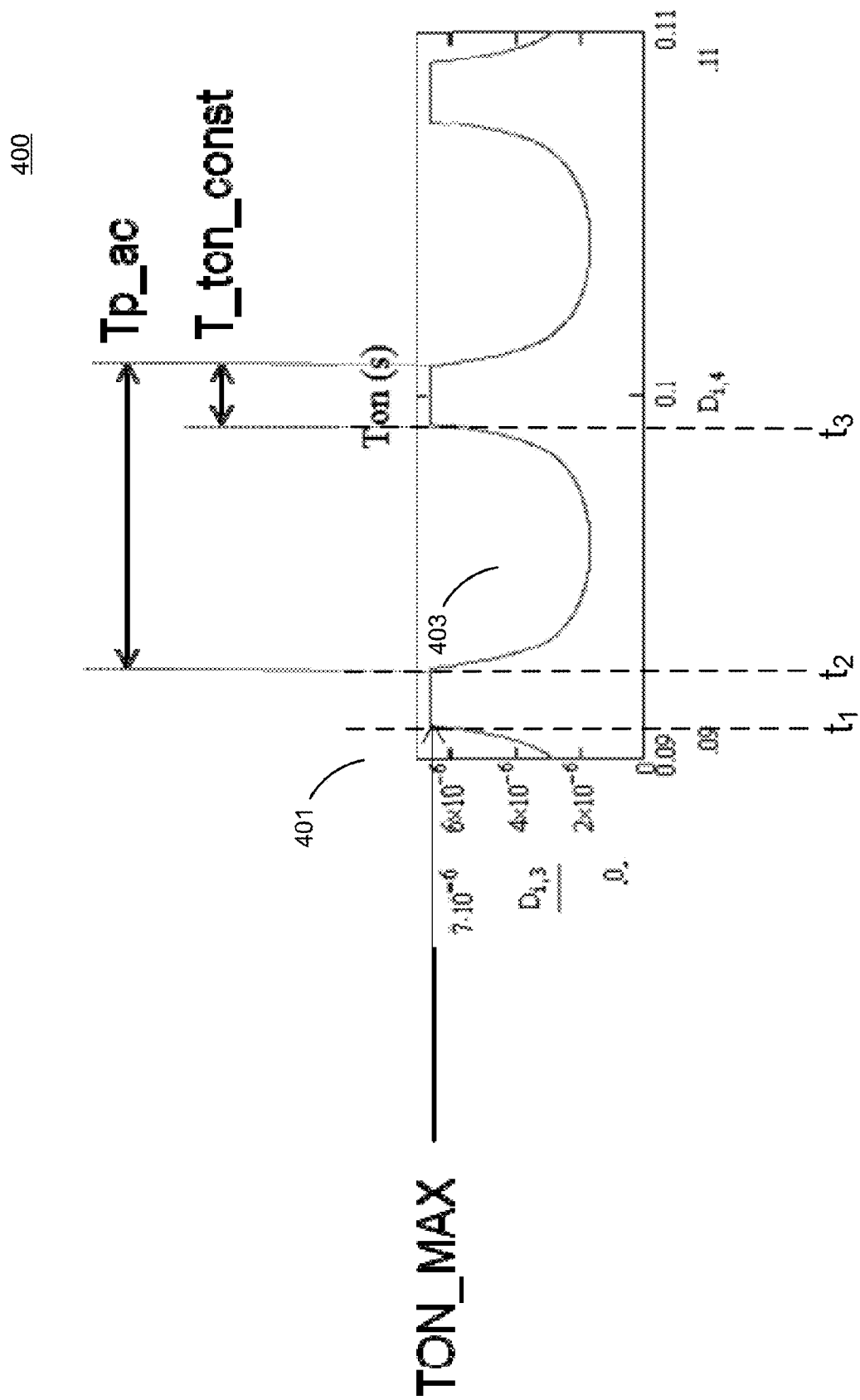
FIG. 4 illustrates an example waveform showing the on-time of a switch of the switching power converter, according to one embodiment.

FIG. 4 illustrates a waveform of the on-time (Ton) of power converter 100 with respect to time using a combination of the constant power mode and the constant on-time mode. In FIG. 4, the operation of power converter 100 in the constant on-time mode occurs during time $t_1$ to time $t_2$. Thus, time $t_1$ to time $t_2$ corresponds to when the input line voltage of power converter 100 is less than the threshold voltage. As shown in FIG. 4, the plateau 401 of the on-time waveform during time $t_1$ to time $t_2$ represents the utilization of the constant on-time during the constant on-time mode.

In FIG. 4, the operation of power converter 100 in the constant power mode occurs during time $t_2$ to time $t_3$. Thus, time $t_2$ to $t_3$ corresponds to when the input line voltage of power converter 100 is greater than the threshold voltage. As shown in FIG. 4, during time $t_2$ to $t_3$, the on-time of power converter 100 may vary 403. Controller IC 101 varies (i.e., increases or decreases) the on-time of the switching power converter during time period $t_2$ to $t_3$ to output constant current and/or voltage depending on the control method employed to deliver constant power to the load. By operating power converter 100 in both the constant on-time mode and the constant power mode within a cycle of the input voltage, controller 101 provides enough power factor to at least meet power factor requirements for low power applications while at the same time providing good output ripple performance. Alternatively, there are some high power applications where a power factor of close to 1.0 (i.e., approaching a value of 1.0 as in power factor of 0.95) is necessary and it is essential that switching power converter 100 has the ability to deliver power at a power factor of close to 1.0.

Generally, the power factor of power converter 100 is based on the percentage of time that the on-time of switch Q1 is constant within an AC cycle of the input voltage to power converter 100. That is, the power factor of power converter 100 is based on the percentage of time that power converter 100 is operated in the constant on-time mode with respect to the constant power mode during an AC cycle of the input voltage to power converter 100. In one embodiment, the percentage of time that the on-time of switch Q1 is constant within an AC cycle is represented by the parameter PF_Index. Thus, the PF_Index represents the percentage of time that the power converter is operated in the constant on-time mode within an AC cycle of the input voltage to the power converter 100. For example, a PF_Index of 25% signifies that power converter 100 is operated in the constant on-time for 25% of the AC cycle of the input voltage and that power converter 100 is operated in the constant power mode for the other 75% of the AC cycle.

Generally, a higher PF_Index results in a higher power factor and lower input harmonic distortion. However, the higher PF_Index sacrifices output ripple performance. A higher PF_Index indicates that power converter 100 is operated for a longer percentage of time in the constant on-time mode during the AC cycle compared to the percentage of time that the power converter 100 is operated in the constant power mode. In contrast, a lower PF_Index increases output ripple performance by minimizing the output ripple. However, the lower PF_Index produces lower power factor and higher input harmonic distortion. A lower PF_Index indicates that power converter 100 is operated for a shorter percentage of time in the constant on-time mode during the AC cycle compared to the percentage of time that power converter 100 is operated in the constant power mode. Configuring the PF_Index allows for design flexibility to address the trade-off between input power factor, input harmonic distortion, and output ripple performance. In one embodiment, the PF_Index is based on the following parameters shown in FIG. 4:

TON_MAX which represents the maximum on-time of the switch Q1;

T_on_const which represents the time duration during which the on-time of the switch Q1 is constant at TON_MAX; and Tp_ac which represents half-cycle of the AC period of the input line voltage.

In one embodiment, the relationship of the above parameters is described by the following equation:

$$\text{PF\_Index} = \frac{\text{T\_on\_const}}{\text{TP\_ac}}$$

As shown above, the PF_Index is based on the ratio of the time duration (i.e., T_on_const) during which the on-time of switch Q1 is constant at TON_MAX and the half the AC period (i.e., Tp_ac).

Figure 5:
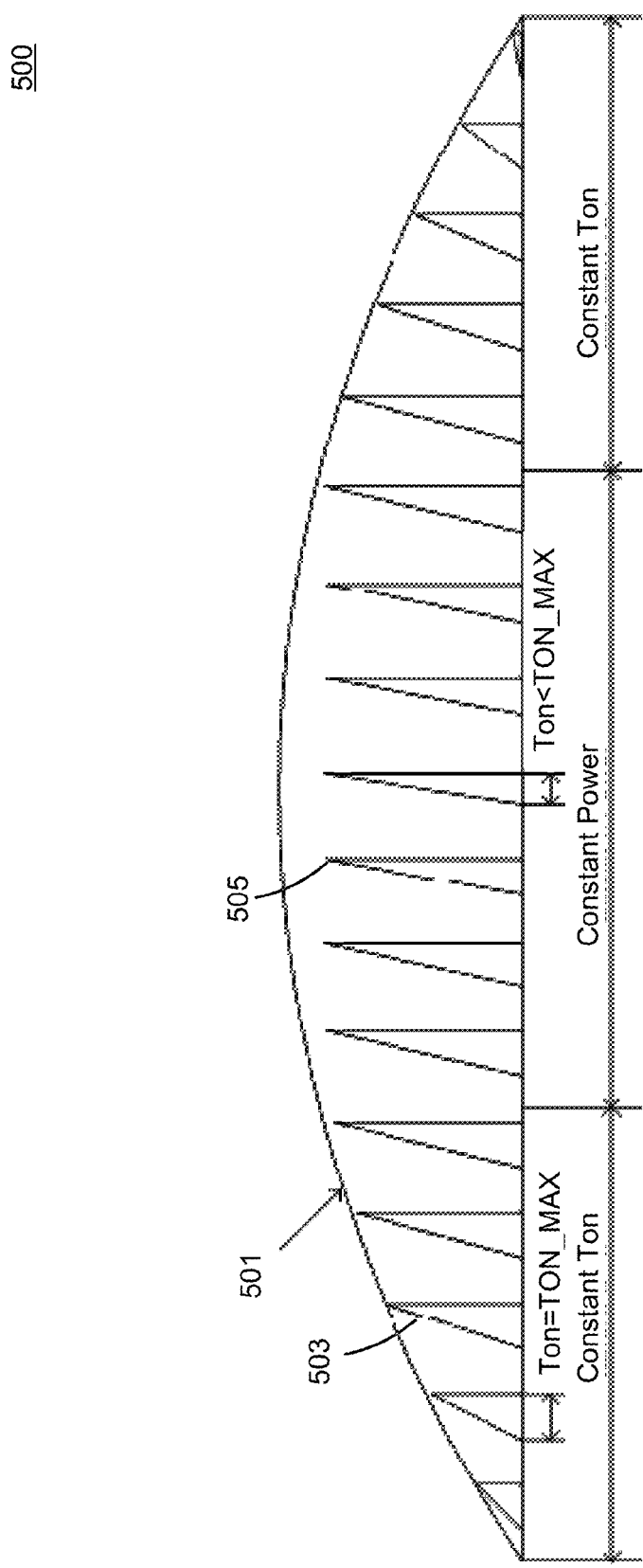
FIG. 5 illustrates an example input voltage and input current waveforms of the switching power converter, according to one embodiment.

FIG. 5 illustrates one example of voltage waveform 501 of the voltage at bulk capacitor C2 with respect to an input current waveform 503 of the input current of power converter 100 using both the power regulation control methods of constant on-time control and constant power control. Note that in the example shown in FIG. 5, constant current mode is used during the constant power control.

As shown in FIG. 5, during the constant on-time (Ton) operation within the AC cycle of the input voltage to power converter 100, digital logic control 305 clamps the on-time (Ton) of switch Q1 at TON_MAX. Thus, the on-time of switch Q1 is constant during the constant on-time control. Furthermore, as shown in FIG. 5, input current waveform 503 follows voltage waveform 501 during the constant on-time control. In contrast, during the constant power control operation during the cycle of the input voltage, the on-time may vary and is less than TON_MAX to maintain constant power delivery to the load. Also, as shown in FIG. 5, input current waveform 503 does not follow voltage waveform 501 during the constant power mode control. For example, peak 505 of the input current maintains constant during the constant power mode due to the use of constant current control while in the constant power mode.

While some conventional techniques use a control loop to configure PF_Index to achieve a trade-off between power factor, harmonic distortion, and ripple performance, it was found that such techniques based on configuring PF_Index have a upper limit on achievable power factor with a reasonable harmonic distortion. For example, conventional power converters using techniques based on configuring PF_Index cannot deliver power for applications requiring a power factor close to 1.0. A novel hysteretic control loop-based technique to control a power converter is proposed and discussed in detail in FIGS. 6 through 8 below.

Figure 6:
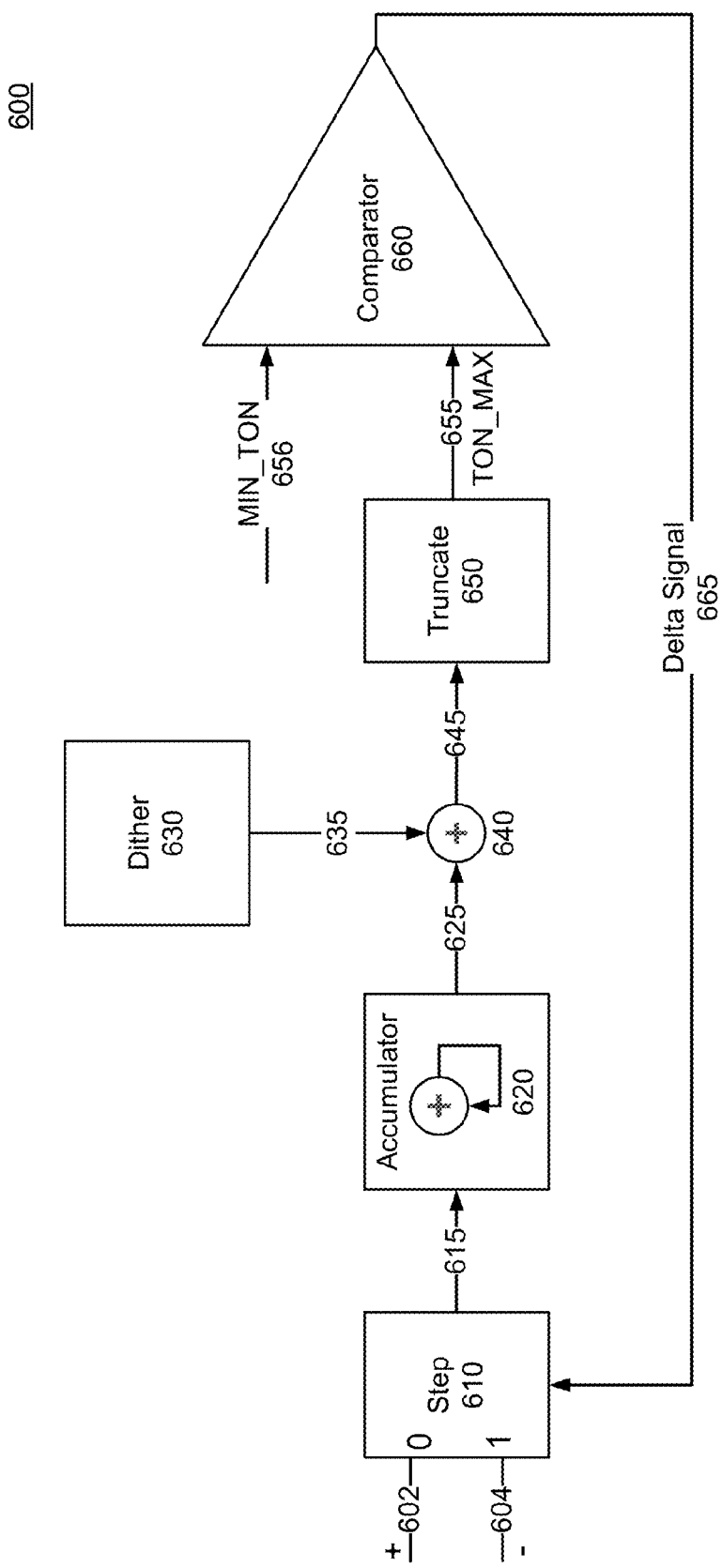
FIG. 6 illustrates a block diagram of a hysteretic control loop of a controller integrated circuit (IC), according to one embodiment.

FIG. 6 illustrates a block diagram of a hysteretic control loop 600 of a controller integrated circuit (IC), according to one embodiment. The hysteretic control loop includes, among others, comparator 660, step block 610, accumulator 620, dither block 630, adder 640, and truncate block 650. Each of the listed blocks can be implemented in either hardware or software, or a combination of hardware and software. While control loop 600 is referred to and explained below as a digital control loop, it is understood that control loop 600 can also be implemented as an analog control loop in accordance with this disclosure. It will be understood that control loop 600 can be operated once at every half-cycle of the AC input line voltage.

Control loop 600 regulates a value of switch on-time (i.e., TON_MAX 655) by comparing it with a switch (e.g., switch Q1 of FIG. 1) on-time value in constant power mode (i.e., MIN_TON 656) corresponding to a peak voltage of the input AC line voltage such that control loop 600 sets TON_MAX 655 within one step value of MIN_TON 656. MIN_TON 656 is a minimum value of a first signal switch on-time that represents the switch on-time of a power converter (e.g., power converter 100) in constant power mode. The first signal represents the switch on-time of the power converter and is related to a rectified input line voltage that is an input to the power converter satisfying the following equation, as described above with reference to FIG. 2:

$$P = \frac{(V_{in} \cdot T_{on})^2}{2 \cdot L_m} \cdot F_s$$

That is, to produce a constant power output, a product of rectified input voltage, $V_{in}$, and on-time of power converter, $T_{on}$, is to be a constant. Accordingly, the first signal, $T_{on}$, representing an on-time of the power converter is inversely proportional to an amplitude of the rectified input voltage. TON_MAX 655 is defined as a threshold value of the switch on-time of the power converter that can determine whether the switching power converter operates in a constant on-time mode or a constant power mode. Threshold value TON_MAX 655 is defined such that when TON_MAX 655 is larger than an instantaneous value of $T_{on}$ during a first time period of AC half-cycle, the power converter is operated in a constant power mode. And for the remaining time duration of the AC half-cycle (i.e., a second time duration), where TON_MAX 655 is either equal to or smaller than an instantaneous value of $T_{on}$, the power converter is operated in a constant on time mode, with on-time clamped as TON_MAX 655. It will be understood that a sum of the first time period and the second time period can result in a time period of one AC half-cycle.

Control loop 600 regulates TON_MAX 655 by comparing TON_MAX 655 with MIN_TON 656 using comparator 660. Comparator 660 receives TON_MAX 655 and MIN_TON 656 as inputs and generates delta signal 665 as an output. When control loop 600 is implemented in digital domain, delta signal 665 can be represented by 1-bit digital output as either "1" or "0." Signal 665 can be propagated to step block 610 to either increase or decrease TON_MAX 655 by a step. For example, when delta signal 665 represents "1," signifying that MIN_TON 656 is smaller than TON_MAX 655, step block 610 can select input—step 604 to decrease TON_MAX 655 by a predetermined value. In one embodiment, TON_MAX 655 can be represented as a digital integer value. For example, TON_MAX 655 can be represented in a digital domain equivalent to an analog voltage value of 5 μs (e.g., a 4-bit value of 0101). Step value can be set in control loop 600 to a fractional value (e.g., equivalent to 0.1 μs analog time step) or an integer value (e.g., equivalent to 1 μs analog time step). It will be understood that step value of step block 610 can be programmable based on a precision requirement of power converter's power factor (by regulating constant on-time mode which can further be regulated by regulating TON_MAX 655). Step block 610 generates output signal 615 that is a fractional time value to be added by accumulator 620 to TON_MAX 655.

Accumulator 620 accumulates TON_MAX 655 with signal 615 of step block 610. For example, accumulator 620 can add (or substract) a fractional value of signal 615 (e.g., digital equivalent to 0.1 μs step) to an integer value of TON_MAX 655 (e.g., digital equivalent to 5 μs) resulting in a fractional value for output signal 625 (e.g., digital equivalent to 5.1 μs. In one embodiment, when a 1 MHz system clock is used, a step size of TON_MAX 655 would be 1 μs. Dither block 630 generates a dithering function that aids in a conversion of a fractional value into an integer representation on average over multiple cycles of the signal. For example, signal 625 at the output of accumulator 620 represents a fractional value equivalent to an analog on-time value of 5.1 μs. Because TON_MAX 655 is expected to be an integer value for a comparison using comparator 660, it is necessary to convert a fractional value of signal 625 to an equivalent integer value.

Dither block 630 helps in converting a fractional value to an integer value by including a random number generator to generate a value between 0 and 0.99 and adding (e.g., using adder 640) the generated random fractional value to fractional value of signal 625 to generate a near integer value for signal 645. For example, each AC input voltage period (equivalent to say 60 Hz frequency of input line voltage) can be sampled to comprise one hundred samples, where each sampling period is one switching cycle for a switch (e.g., switch Q1) of power converter. That is, for each AC input voltage period there would be one hundred switching cycles. When signal 625 represents a fractional value of 5.1 μs that needs to be converted to an integer value, dither 630 generates a fractional random value for each switching cycle such that an average value of TON_MAX 655 over each AC input period (i.e. over one hundred switching cycles) is equivalent to 5.1 μs. The two closest integer values for 5.1 μs is either 5 μs or 6 μs. For a dither block 630, a probability of generating a fractional random value of 0.9 or larger (from a range of possible values 0-0.99) is ten percent. That is, dither 630 generates a fractional value of 0.9 or higher at signal 635 in ten cycles out of one hundred switching cycles. For those ten cycles with a value of 0.9 or higher, signal 645 (i.e., output of adder 640) represents a value between 6.0 and 6.09 μs. For the other 90 cycles where dither block 630 generates a fractional random value of less than 0.9, output signal 645 represents a value between 5.1 and 5.99 μs.

Signal 645 is propagated as an input signal to truncate block 650. Truncate block 650 performs fractional to integer conversion for signal 645 by truncating (or removing) a fractional value of input signal 645 and resulting in an integer value for output signal, TON_MAX 655. For example, for the ten switching cycles where input signal to truncate block 650 (i.e., signal 645) represents a value between 6.0 μs and 6.09 μs, truncate block 650 removes the fractional portion of signal 645 and results in a value of 6.0 μs for TON_MAX 655. For the other 90 cycles signal 645 represents a value between 5.1 and 5.99 μs, truncate block 650 removes the fractional portion of signal 645 and results in a value of 5.0 μs for TON_MAX 655. In summary for each AC input voltage period, TON_MAX 655 represents 5 µs for 90% of the period and 6 µs for 10% of the period for an average value of 5.1 µs over the period. Control loop 600 can adjust a value of TON_MAX 655 for each cycle of AC input voltage. Alternatively, control loop 600 can adjust TON_MAX 655 for each half-cycle of AC input voltage.

Control loop 600 reaches a steady state operation when TON_MAX 655 is within one step of MIN_TON 656. When control loop 600 reaches a steady state operation, TON_MAX 655 will be increased by one step in a first AC cycle and subsequently decreased by one step in the next consecutive AC cycle. The process of increasing TON_MAX 655 in one AC cycle and decreasing in the next AC cycle continues until the input AC line voltage changes. A change in the input AC line voltage is discussed in detail below with reference to FIGS. 8 and 9.

In an embodiment where control loop 600 is implemented in analog domain, signal 665 represents a continuous-time waveform (e.g., a pulse waveform) with a pulse width of signal 665 representing a difference in TON_MAX 655 and MIN_TON 656. In an analog implementation of control loop 600, dither 630 and truncate 650 blocks need not be implemented. Step block 610 receives signal 665 such that step block 610 selects a fractional step value to adjust TON_MAX 655, where the fractional step value is based on delta signal 665. In an analog representation, MIN_TON 656 can be a sinusoidal waveform that represents an on-time of a power converter (e.g., power converter 100) instead of a single time point used in a digital implementation of control loop 600.

Figure 7:
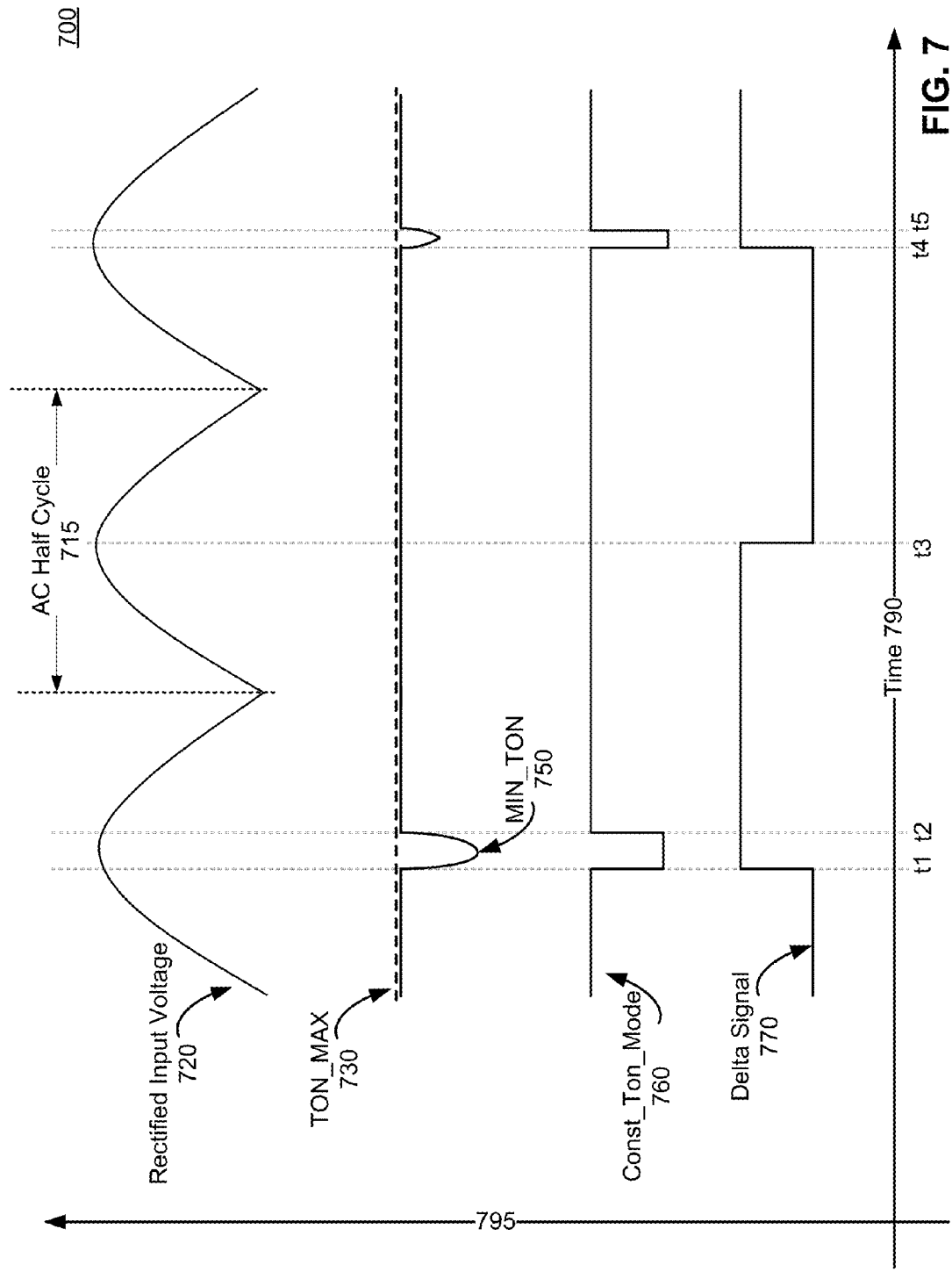
FIG. 7 illustrates exemplary waveforms depicting a steady-state operation of the hysteretic control loop depicted in FIG. 6, according to one embodiment.

FIG. 7 illustrates exemplary waveforms depicting a steady-state operation of the hysteretic loop depicted in FIG. 6, according to one embodiment. The exemplary waveforms are depicted on an independent time axis, time 790, and a dependent axis, 795. Dependent axis 795 can represent either voltage to depict rectified input voltage 720 and can also represent time to depict time-based signals such as, TON_MAX 730, MIN_TON 750, Const_Ton_Mode 760, and Delta Signal 770. FIG. 7 illustrates exemplary waveforms of a controller IC (e.g., controller 101) in response to a steady state for three half AC cycle periods. Rectified input voltage 720 is related to an input AC line voltage that can be rectified as shown. TON_MAX 730 is a regulated switch on-time signal generated by the controller IC and MIN_TON 750 is a minimum value of a switch on-time of during a constant power mode that corresponds to the peak voltage at a given half AC cycle.

Const_Ton_Mode 760 is a signal generated from the controller IC that provides an indication whether the power converter is operated in a constant on-time mode or a constant power mode. For example, if Const_Ton_Mode signal 760 depicts a high-level signal (i.e., active high level or a digital high signal indicating that the signal is on), it can represent that the power converter is operating in a constant on-time mode and if Const_Ton_Mode 760 depicts a low-level signal (i.e., active low signal or a digital low signal), it can represent that the power converter is operating in a constant power mode. Const_Ton_Mode 760 can be a low-level signal (i.e., off) if TON_MAX 730 is greater than MIN_TON 750 and can be a high-level signal if TON_MAX 730 is smaller than MIN_TON 750. Delta signal 770 is similar to delta signal 665 described above with reference to FIG. 6. Delta signal 770 is a signal that can be fed back to step block of the hysteretic loop to either increase or decrease TON_MAX 730. Delta signal 770 can be related to Const_Ton_Mode 760 such that delta signal 770 changes its level only after a certain minimum pulse width of Const_Ton_Mode 760. For example, for delta signal 770 to change from low to high, Const_Ton_Mode 760 might need to have a low pulse for a predetermined duration of time. In one embodiment, the predetermined duration of time can be a predetermined number of switching cycles (e.g., 3 switching cycles) before which delta signal 770 will change its level and thereby triggering control loop 600 to change a value of TON_MAX 730.

In the first half cycle depicted in FIG. 7, TON_MAX 730 has a value greater than a value for MIN_TON 750 as depicted between time points, t1 and t2. Const_Ton_Mode 760 will have a low pulse between the time points t1 and t2 to signify that the power converter is operating in a constant power mode between t1 and t2. Delta signal 770 can have a high pulse at time points t1 and t2 to signify that control loop 600 has to decrease a value of TON_MAX 730. In the second half cycle that includes time point t3, the value of TON_MAX 730 is the same as a value of MIN_TON 750 during the second half cycle. It will be understood that even though TON_MAX 730 is shown to be slightly larger than MIN_TON 750 at t3, it is actually intended that TON_MAX 730 is the same as (or the difference is less than one step of control loop 600) MIN_TON 750. Because the difference between TON_MAX 730 and MIN_TON 750 is less than minimum step size of control loop 600, Const_Ton_Mode 760 will have a high pulse and delta signal 770 will have a low pulse, which will increase a value of TON_MAX 730.

In the third half cycle that includes time points t4 and t5, the value of TON_MAX 730 is again larger than that of MIN_TON 750. Similar to the first half cycle, Const_Ton_Mode 760 has a low pulse and delta signal 770 has a high pulse between t4 and t5 thereby decreasing a value of TON_MAX 730. It will be appreciated that a delta between TON_MAX 730 and MIN_TON 750 has reduced in the third half cycle as compared to the first half cycle as evident by a reduced low pulse width of Const_Ton_Mode 760. Control loop 600 can keep adjusting TON_MAX 730 as long as a delta between TON_MAX 730 and MIN_TON 750 is less than a minimum step size of control loop 600.

Figure 8:
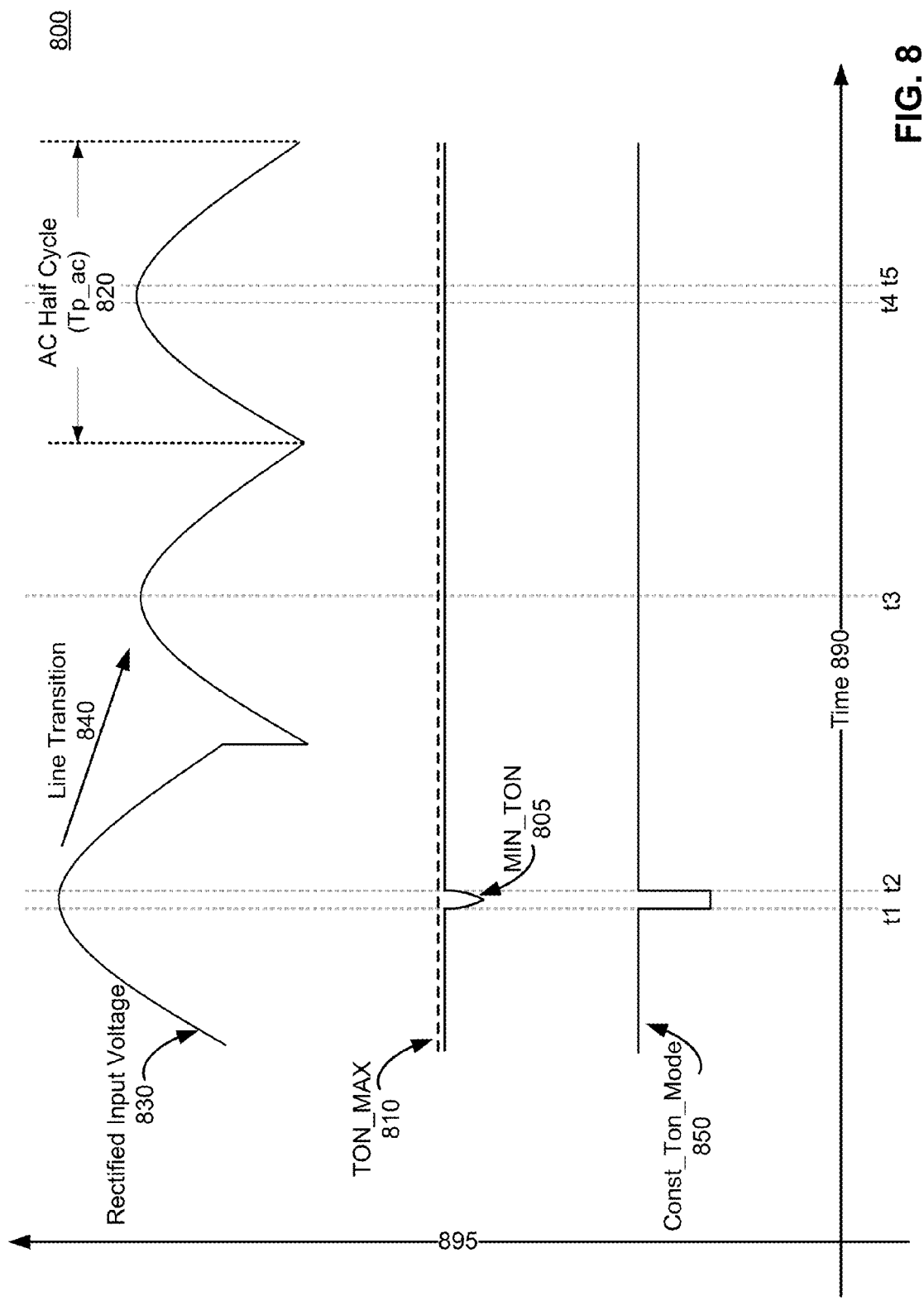
FIG. 8 illustrates exemplary waveforms of the controller IC in response to a transition of the input voltage from a high voltage to a low voltage, according to one embodiment.

FIG. 8 illustrates exemplary waveforms of the controller IC in response to a transition of the input voltage from a high voltage to a low voltage during a line-transient event (i.e. input AC line voltage steps down and thereby MIN_TON 805 steps up), according to one embodiment. FIG. 8 depicts an exemplary embodiment where a power converter (e.g., power converter 100) is operated to deliver power at a power factor of close to 1.0. FIG. 8 shows a waveform corresponding to a rectified input voltage waveform 830 of the power converter. FIG. 8 also depicts TON_MAX 810, Tp_ac 820, and Const_Ton_Mode 850. TON_MAX 810 is a threshold value for a switch on-time signal of a controller IC (e.g., controller 101) that aids in determining whether power converter 100 is to be operated in a constant on-time mode or in a constant power mode as described above with reference to FIGS. 4 through 6. Const_Ton_Mode 850 is a pulse waveform that indicates when power converter 100 is operated in a constant on-time mode and when power converter 100 is operated in constant power mode as described above with reference to FIG. 7. Tp_ac 820 represents half-cycle of the AC period of the input line voltage.

FIG. 8 further depicts a transition, line transition 840, of rectified input voltage 830 from a high value to a low value. An exemplary line transition 840 corresponding to a high to low input line voltage transition can be a transition from 120V to 110V due to voltage fluctuations of the line voltage. For a line voltage transition from high to low voltage, the MIN_TON value of the line voltage increases (not shown in FIG. 8). Control loop 600 would need to adjust TON_MAX 810 in response to line transition 840 to maintain a same power factor for power converter 100. When power factor is close to 1.0, TON_MAX 810 needs to be set to a value very close to a minimum value (i.e., MIN_TON) of on-time waveform. Control loop 600 adjusts TON_MAX 810 by comparing TON_MAX 810 with MIN_TON 805. Control loop 600 generates Const_Ton_Mode 850 that represents a difference between a signal representing a switch on-time of power converter and TON_MAX 810. For example, pulse width of Const_Ton_Mode 850 can represent a time duration during which the power converter is operated in a constant on-time mode. Const_Ton_Mode 850 can also represent a time duration during which the power converter is operated in a constant power mode when Const_Ton_Mode 850 is active low. Control loop 600 can generate Const_ton_mode 850 by comparing MIN_TON 805 with TON_MAX 810 for every half AC cycle.

TON_MAX 810 can be adjusted by control loop 600 by increasing TON_MAX 810 until control loop 600 observes a low pulse for Const_Ton_Mode 850. A low pulse for Const_Ton_Mode 850 occurs when TON_MAX 810 is within one step of control loop 600 when compared with new MIN_TON after line transition 840. In one embodiment, control loop 600 can initiate increasing the size of the step to a predetermined value to adjust TON_MAX 810 until a low pulse appears on Const_Ton_Mode 850 signal. The size of step can be chosen from a set of predetermined values in such a way that the chosen step size can be increased until TON_MAX 810 can track a transition in MIN_TON. For example, if Const_Ton_Mode 810 is missing a low pulse for three AC half-cycles, the predetermined step size can be increased to a first predetermined step size and the loop continues to detect for a low pulse on Const_Ton_Mode 850 signal. If the loop cannot detect a low pulse on Const_Ton_Mode 850 signal for more AC half-cycles (e.g., three more AC half-cycles), the loop can increase the step size to a second predetermined step size, where the second predetermined step size can be larger than the first predetermined step size. The loop can repeat the above method of trying to detect a low pulse on Const_Ton_Mode 850 and increasing the step size until the loop detects a low pulse on Const_Ton_Mode 850. Once a low pulse is detected for Const_Ton_Mode 850, the controller IC restores the loop step size to a normal step size to resume a steady-state operation of control loop 600. Once TON_MAX 810 is adjusted to be within one step size of control loop 600 when compared with new MIN_TON (after line transition 840), control loop 600 has successfully corrected for input voltage transition and control loop 600 resumes its normal operation as described above with reference to FIGS. 6 and 7.

FIG. 9 illustrates exemplary waveforms of the controller IC in response to a transition of the input voltage from a low voltage to a high voltage during a line-transient event (i.e. input AC line voltage steps up and thereby MIN_TON 905 steps down), according to one embodiment. FIG. 9 depicts an exemplary embodiment where a power converter (e.g., power converter 100) is operated to deliver power at a power factor of close to 1.0. FIG. 9 shows a waveform corresponding to a rectified input voltage waveform 930 of the power converter. FIG. 9 is similar to FIG. 8 described above except that FIG. 8 represents an input voltage transition from high to low voltage whereas FIG. 9 represents a transition from low to high voltage.

FIG. 9 depicts a transition, line transition 940, of rectified input voltage 930 from a low value to a high value. An exemplary line transition 940 corresponding to a low to high input line voltage transition can be a transition from 110V to 120V due to voltage fluctuations of the line voltage. For a line voltage transition from low to high voltage, the MIN_TON of the line voltage decreases as depicted by MIN_TON transition 945. Control loop 600 would need to adjust TON_MAX 910 in response to MIN_TON transition 945 to maintain a same power factor for power converter 100 even after line transition 940. When power factor is close to 1.0, TON_MAX 910 needs to be set to a value very close to a minimum value of on-time waveform 905. Control loop 600 adjusts TON_MAX 910 by comparing TON_MAX 910 with MIN_TON 905. Control loop 600 generates Const_Ton_Mode 850 that represents a difference between a signal representing a switch on-time of power converter and TON_MAX 910. For example, an active high pulse width of Const_Ton_Mode 950 can represent a time duration during which the power converter is operated in a constant on-time mode. Const_Ton_Mode 950 can also represent a time duration during which the power converter is operated in a constant power mode when Const_Ton_Mode 950 is active low. Control loop 600 can generate Const_Ton_Mode 950 by comparing MIN_TON 905 with TON_MAX 910 for every half AC cycle.

TON_MAX 910 can be adjusted by control loop 600 by decreasing TON_MAX 910 until control loop 600 observes a high pulse for Const_Ton_Mode 950. A high pulse for Const_Ton_Mode 950 occurs when TON_MAX 910 is within one step of control loop 600 when compared with new MIN_TON after MIN_TON transition 945. In one embodiment, control loop 600 can decrease the size of the step to adjust TON_MAX 910 by monitoring a duration of time Const_Ton_Mode 950 stays low. For example, if control loop 600 determines that Const_Ton_Mode 950 stays low for a predetermined amount of time, control loop 600 can decrease the TON_MAX 910 by a step size that is predetermined and is proportional to the predetermined amount of time. In one embodiment, instead of decreasing TON_MAX 910, the controller IC can directly measure a value of MIN_TON after MIN_TON transition 945 as the MIN_TON value after MIN_Ton transition 945 is visible, as depicted in FIG. 9, and assign this value to TON_MAX 910, so that it will be faster to adjust TON_MAX 910 in this transition case. Alternatively, the controller is configured to decrease TON_MAX 910 by an amount that is proportional to an increase in the input AC line voltage. Once TON_MAX 910 is adjusted to be within one step size of control loop 600 when compared with new MIN_TON (after MIN_TON transition 945), control loop 600 has successfully corrected for input voltage transition and control loop 600 resumes its normal operation as described above with reference to FIGS. 6 and 7.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of symbolic representations of operations on information. These representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the operations described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A switching power converter comprising:
   a transformer including a primary winding coupled to an input voltage and a secondary winding coupled to an output of the switching power converter;
   a switch coupled to the primary winding of the transformer, current passing through the primary winding while the switch is turned on and not passing through while the switch is turned off;
   a controller configured to generate a control signal to turn on and turn off the switch at each of a plurality of switching cycles of the switch;
   wherein for each alternating current (AC) half-cycle of the input voltage, the controller is further configured to:
      determine a minimum value of a first signal representing an on-time of the switching power converter,
      compare the determined minimum value with a threshold value of the first signal, the threshold value is used to determine whether the switching power converter operates in a constant on-time mode or in a constant power mode, and
      adjust the threshold value by increasing or decreasing the threshold value based on a result of the comparison; and
   wherein the controller generates the control signal to operate the switching power converter in a constant power mode during a first time period of the AC half-cycle, the first time period representing a duration where the threshold value is larger than an instantaneous value of the first signal.

2. The switching power converter of claim 1, wherein the controller is further configured to generate the control signal to operate the switching power converter in a constant on-time mode during a second time period of the AC half-cycle, the second time period representing a duration that is different from the first time period and a sum of the first time period and the second time period results in a time period of the AC half-cycle.

3. The switching power converter of claim 1, wherein the controller is configured to adjust the threshold value by increasing the threshold value when the comparison results in the minimum value being larger than the threshold value.

4. The switching power converter of claim 1, wherein responsive to an increase in the input voltage, the controller is configured to decrease the threshold value in proportion to the input voltage increase.

5. The switching power converter of claim 1, wherein the controller is configured to adjust the threshold value by decreasing the threshold value when the comparison results in the minimum value being smaller than the threshold value.

6. The switching power converter of claim 1, wherein responsive to a decrease in the input voltage, the controller is configured to increase the threshold value by a predetermined value.

7. The switching power converter of claim 1, wherein the controller is configured to determine the minimum value, compare the minimum value with the threshold value, and adjust the threshold value in a digital implementation of a control loop.

8. The switching power converter of claim 7, wherein the controller is configured to adjust the threshold value by adding a dithering value to convert a fractional value of the threshold value adjustment into an integer value spread over each alternating current half-cycle of the input voltage.

9. The switching power converter of claim 7, wherein the controller is configured to adjust the threshold value by converting a fractional value of the threshold value adjustment into an integer value by using a truncating function.

10. A switching power converter comprising:
   an inductor coupled to an input voltage on one side and to an output of the switching power converter on the other side;
   a switch coupled to the inductor, current passing through the inductor while the switch is turned on and not passing through while the switch is turned off;
   a controller configured to generate a control signal to turn on and turn off the switch at each of a plurality of switching cycles of the switch;
   wherein for each alternating current (AC) half-cycle of the input voltage, the controller is further configured to:
      determine a minimum value of a first signal representing an on-time of the switching power converter,
      compare the determined minimum value with a threshold value of the first signal, the threshold value is used to determine whether the switching power converter operates in a constant on-time mode or in a constant power mode, adjust the threshold value by increasing or decreasing the threshold value based on a result of the comparison; and wherein the controller generates the control signal to operate the switching power converter in a constant power mode during a first time period of the AC half-cycle, the first time period representing a duration where the threshold value is larger than an instantaneous value of the first signal.

11. In a controller, a method of controlling a switching power converter, the switching power converter including a transformer coupled between an input voltage and an output of the switching power converter, the transformer including a primary winding coupled to the input voltage and a secondary winding coupled to the output of the switching power converter, and a switch coupled to the primary winding of the transformer, current passing through the primary winding while the switch is turned on and not passing through while the switch is turned off, the method comprising:

generating a control signal to turn on and turn off the switch at each of a plurality of switching cycles of the switch;

wherein for each alternating current (AC) half-cycle of the input voltage, the method further comprising:

determining a minimum value of a first signal representing an on-time of the switching power converter, comparing the determined minimum value with a threshold value of the first signal, the threshold value is used to determine whether the switching power converter operates in a constant on-time mode or in a constant power mode, and adjusting the threshold value by increasing or decreasing the threshold value based on a result of the comparison; and wherein the control signal is generated to operate the switching power converter in a constant power mode during a first time period of the AC half-cycle, the first time period representing a duration where the threshold value is larger than an instantaneous value of the first signal.

12. The method of claim 11, wherein the control signal is generated to operate the switching power converter in a constant on-time mode during a second time period of the AC half-cycle, the second time period representing a duration that is different from the first time period and a sum of the first time period and the second time period results in a time period of the AC half-cycle.

13. The method of claim 11, wherein the threshold value is adjusted by increasing the threshold value when the comparison results in the minimum value being larger than the threshold value.

14. The method of claim 11, wherein responsive to an increase in the input voltage, the threshold value is decreased in proportion to the input voltage increase.

15. The method of claim 11, wherein the threshold value is adjusted by decreasing the threshold value when the comparison results in the minimum value being smaller than the threshold value.

16. The method of claim 11, wherein responsive to a decrease in the input voltage, the threshold value is increased by a predetermined value.

17. The method of claim 11, wherein determining the minimum value, comparing the minimum value with the threshold value, and adjusting the threshold value is implemented in a digital control loop.

18. The method of claim 17, wherein the threshold value is adjusted by adding a dithering value to convert a fractional value of the threshold value adjustment into an integer value spread over each alternating current half-cycle of the input voltage.

19. The method of claim 17, wherein the threshold value is adjusted by converting a fractional value of the threshold value adjustment into an integer value by using a truncating function.

20. In a controller, a method of controlling a switching power converter, the switching power converter including an inductor coupled between an input voltage on one side and an output of the switching power converter on the other side, and a switch coupled to the inductor, current passing through the inductor while the switch is turned on and not passing through while the switch is turned off, the method comprising:

generating a control signal to turn on and turn off the switch at each of a plurality of switching cycles of the switch;

wherein for each alternating current (AC) half-cycle of the input voltage, the method further comprising:

determining a minimum value of a first signal representing an on-time of the switching power converter, comparing the determined minimum value with a threshold value of the first signal, the threshold value is used to determine whether the switching power converter operates in a constant on-time mode or in a constant power mode, and adjusting the threshold value by increasing or decreasing the threshold value based on a result of the comparison; and wherein the control signal is generated to operate the switching power converter in a constant power mode during a first time period of the AC half-cycle, the first time period representing a duration where the threshold value is larger than an instantaneous value of the first signal.

* * * * *